United States Patent

[11] 3,601,148

| [72] | Inventors | William B. Jeffrey<br>Irwin;<br>William H. Reno, Monroeville, both of, Pa. |
|---|---|---|
| [21] | Appl. No. | 864,358 |
| [22] | Filed | Oct. 7, 1969 |
| [45] | Patented | Aug. 24, 1971 |
| [73] | Assignee | Westinghouse Air Brake Company<br>Wilmerding, Pa. |

[54] FLUID-PRESSURE-REGULATING VALVE DEVICE
1 Claim, 1 Drawing Fig.

[52] U.S. Cl. .................................... 137/484.8,
137/505.36
[51] Int. Cl. .................................... G05d 16/06
[50] Field of Search .................................... 137/484.8,
484.2, 484.4, 484.6, 498, 502, 505.18, 505.26 X,
505.36, 505.37

[56] References Cited
UNITED STATES PATENTS

| 2,323,888 | 7/1943 | Wright | 137/484.8 |
| 2,599,577 | 6/1952 | Norgren | 137/484.8 |
| 3,251,376 | 5/1966 | Worden | 137/484.8 |
| 3,285,280 | 11/1966 | Bryant | 137/484.8 |

Primary Examiner—M. Cary Nelson
Assistant Examiner—Robert J. Miller
Attorney—Ralph W. McIntire, Jr.

ABSTRACT: A fluid-pressure-regulating valve device including adjusting means for setting the device to deliver fluid at a selected pressure, piston-operated valve means for controlling and maintaining delivery of fluid at the preselected pressure level, the piston for operating said valve means being normally biased in one direction by an adjustable force for opening said valve means and being subject to supply fluid pressure acting thereon in opposition to said adjustable force for closing said valve means when the delivered pressure attains said preselected pressure sufficient for overriding said adjustable force venturi means in the supply communication for causing the pressure of supply fluid acting on the piston to be reduced to a lesser degree than the delivered pressure for thereby affecting the piston to maintain the valve means in its fully open position until the preselected pressure is attained, and means for effecting balance of pressure on both sides of the valve means for rendering the piston more sensitive to any change in the degree of delivered pressure when the valve means is closed.

PATENTED AUG 24 1971
3,601,148
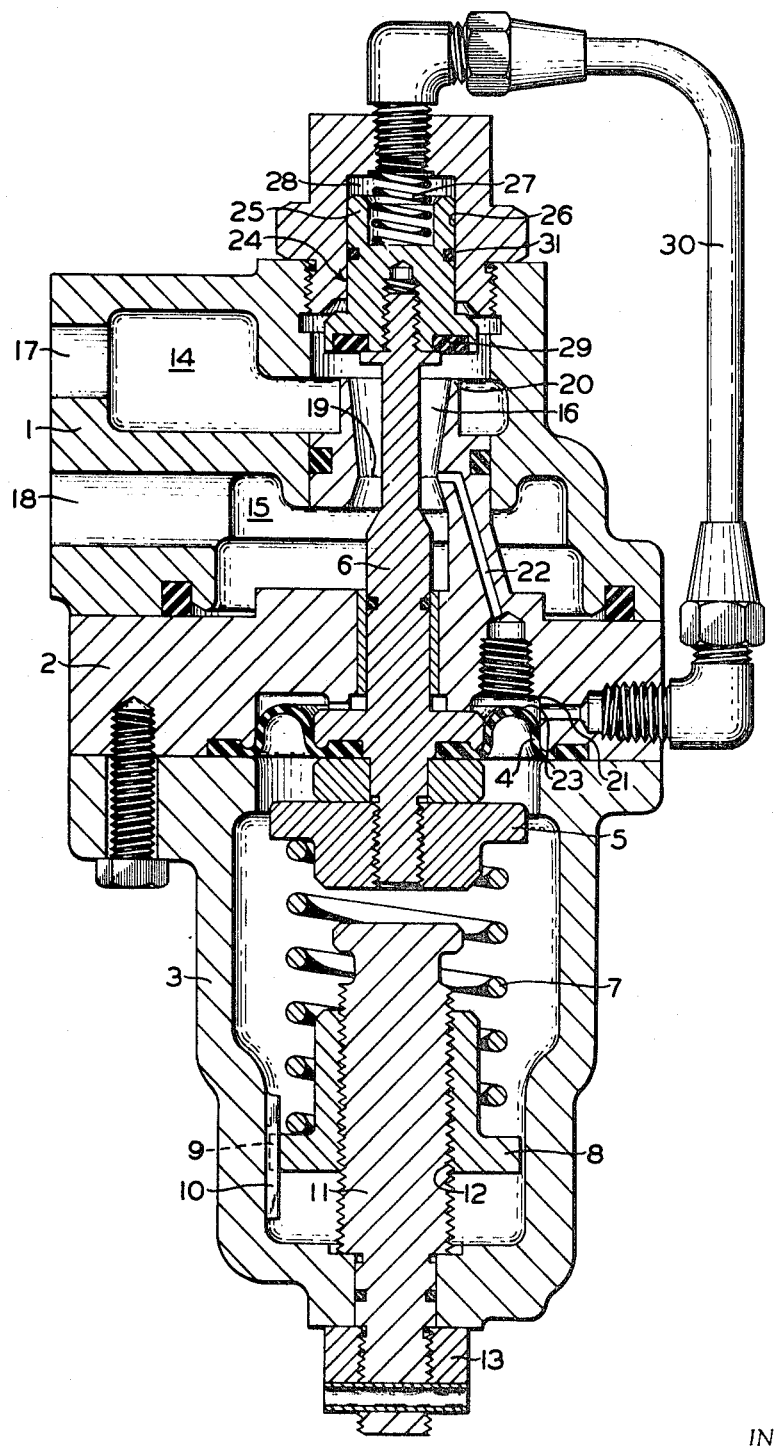
INVENTOR.
WILLIAM B. JEFFREY
BY WILLIAM H. RENO
Ralph W. McIntire, Jr.
ATTORNEY 3,601,148

FLUID-PRESSURE-REGULATING VALVE DEVICE

BACKGROUND OF THE INVENTION

Fluid-pressure-regulating valve devices are used extensively and in many types of fluid pressure systems for controlling the degree of fluid pressure delivered from a source of fluid under pressure to the device to be operated thereby and for maintaining the fluid delivered at a level of preselected pressure commensurate with that required by the system or apparatus to be operated thereby. Such pressure-regulating devices are used, for example, in fluid-pressure-operable brake apparatus for railway vehicles and are, in many instances, commonly called feed valve devices. The feed valve device is preset to effect supply of fluid under pressure from a source, such as the main reservoir, to the several control devices of the brake apparatus at a pressure in accordance with the setting of the feed valve device as dictated by the requirement of the brake apparatus. A feed valve device of the type presently under discussion is described and designated as the D-24-B feed valve in Instruction Pamphlet No. 5063-11, dated June 1963, relating to SMEE Brake Equipment with Cineston®Controller and published by Westinghouse Air Brake Division of Westinghouse Air Brake Co., Wilmerding, Pennsylvania.

Due to the extensive use of pressure-regulating devices or feed valves of the type above mentioned, there is a need for pressure-regulating valve devices characterized by simplicity of structure and, consequently, trouble-free performance and low production cost.

SUMMARY OF THE INVENTION

The object of the present invention is to provide a simplified fluid-pressure-regulating valve device at a low production cost and capable of trouble-free operation.

The present invention comprises a pressure-regulating valve device having a fluid pressure inlet and a fluid pressure outlet connected by passage means in the form of a venturi in which a valve member is operably disposed, adjacent the inlet end, for controlling supply of fluid under pressure from said inlet to said outlet whence said fluid is supplied to a device, devices, or apparatus to be operated thereby. A piston member for effecting operation of the valve member to one or the other of an open or closed position in which communication through the passage means is either open or closed, respectively, is subjected on one side to the force of a compressibly adjustable spring, for determining the degree of pressure at which fluid is delivered to the outlet, and on the other side to the force of fluid pressure supplied to the passage means and communicated to said other side of the piston via a passageway leading from the throat of the venturi, thereby, in effect, subjecting said other side of the piston to a lesser pressure than that delivered to the outlet, thus causing the piston to maintain said valve member in a fully opened position and consequently unhindered delivery of fluid under pressure to the outlet until the force of fluid pressure acting on said other side of the piston attains a degree sufficient for overriding the opposing force of said spring, which causes the piston to operate the valve member to its closed position. The fluid-pressure-regulating valve device embodying the invention also includes means whereby fluid pressure delivered to the outlet and acting on the delivery or outlet side of the valve member is also communicated to the opposite side thereof to provide a balance of pressure on both sides of the valve member, thus eliminating any pressure differential across the valve member and, in effect, rendering the piston member more sensitively responsive to any changes in pressure on the delivery side of the valve member.

The single FIGURE drawing is an elevational, diagrammatic view, in section, of a fluid-pressure-regulating valve device embodying the invention.

DESCRIPTION AND OPERATION

As viewed in the drawing, the fluid-pressure-regulating valve device comprises an upper casing section 1, an intermediate casing section 2, and a lower casing section 3.

A diaphragm-type piston member 4 is clamped at its outer periphery between intermediate casing section 2 and lower casing section 3, and is reciprocably operable therein. The inner periphery of piston member 4 is secured by a piston follower assembly 5 to the lower end, as viewed in the drawing, of a piston stem 6.

The underside of piston member 4, as viewed in the drawing, is subject to the force of a spring 7 disposed in the lower casing section 3, said spring being compressibly adjustable between the piston follower assembly 5 and a spring seat 8. The spring seat 8 is fixed against rotation by a notch 9 formed on the periphery thereof and engaging a longitudinally disposed guide rib 10 formed on the inner wall of lower casing section 3. The axial position of spring seat 8 within lower casing section 3, and therefore the compression of spring 7, may be adjusted by an adjusting screw 11 having one end coaxially screwed into a threaded bore 12 in said spring seat and the other end extending outside lower casing section 3. The end of screw 11 extending outside lower casing section 3 has a nut 13 removably fixed thereon, by which nut said screw may be turned in place for effecting axial movement and adjustment of the spring seat 8, the notch 9 riding on the rib 10 as said spring seat is axially adjusted.

The upper casing section 1 is provided with a supply chamber 14, a delivery chamber 15, and a passageway 16 via which fluid under pressure supplied to said supply chamber via an inlet 17 may flow from said supply chamber to said delivery chamber whence fluid under pressure is delivered via an outlet 18 to a device or apparatus (not shown) to be operated thereby. The passageway 16 is in the form of a venturi having a throat or constriction 19 to provide venturi action during flow of fluid under pressure therethrough, the end of said passageway adjacent supply chamber 14 being encircled by a rib-type valve seat 20.

The intermediate casing section 2 cooperates with piston member 4 to form a balancing chamber 21 connected to passageway 16 by a passageway 22 opening to said passageway 16 at the throat 19. A pressure area 23 forming the upper side, as viewed in the drawing, of piston member 4, is subject, therefore, to pressure of fluid supplied to passageway 16, but at a lesser pressure than that in delivery chamber 15 because fluid pressure in balancing chamber 21 is supplied thereto via passageway 22, which connects to passageway 16 at the throat 19 which is the point in the venturi at which the pressure is the lowest.

A cutoff valve assemblage 24 comprising a pistonlike valve support member 25 coaxially and removably secured to the upper end of piston stem 6 opposite piston member 4, is coaxially and slidably disposed in a bore 26 formed in the upper casing section 1. A spring 27 disposed in a cutoff valve chamber 28 formed in upper casing section 1 adjacent the upper side, as viewed in the drawing, of the valve support member 25, urges said valve support member and, therefore, an annular valve element 29 disposed on the lower side thereof, downwardly toward a closed position in which said valve element occupies a seated position on valve seat 20 to thereby cut off communication through passageway 16.

Chamber 28 in upper casing section 1 is connected to balancing chamber 21 in intermediate casing section 2 by suitable means, such as a pipe 30 in this instance, for a purpose to be hereinafter disclosed.

In operation, fluid under pressure is normally supplied to the inlet 17 from a source such as a main reservoir (not shown) and at a pressure higher than that required by the apparatus to be operated thereby, The pressure of fluid supplied to the inlet 17 may be on the order of 130 P.S.I to 130 P.S.I. for example, whereas the apparatus, such as a brake system, for example, to be operated by such fluid under pressure may require fluid at a pressure of 110 P.S.I. only. Accordingly, the compression of spring 7 is adjusted by screw 11 to a degree at which the pressure-regulating valve device operates, as will be described below, to limit the pressure of fluid delivered to outlet 18 to that required by the apparatus to be operated thereby.

In a normal position of piston member 4, in which it is shown in the drawing, valve support member 25 is retained by stem 6 in a supply position in which valve element 29 occupies an unseated position relative to valve seat 20, thereby opening communication between supply chamber 14 and passageway 16. Fluid under pressure may thus flow from inlet 17 to outlet 18 (and, therefore, to the apparatus to be operated thereby) via supply chamber 14, passageway 16, delivery chamber 15 and outlet 18.

At the same time fluid under pressure from passageway 16 also flows via passageway 22 to balancing chamber 21. Since, as above noted, passageway 22 connects to passageway 16 at the throat 19, and, therefore, the pressure acting on pressure area 23 is at a lesser degree than that reaching the outlet 18, piston member 4 and, therefore, valve element 29 are sustained in their normal and unseated positions, respectively, to maintain unhindered flow of fluid under pressure from supply chamber 14 to delivery chamber 15 until the force of fluid pressure in balancing chamber 21 and, as such, acting on said pressure area of said piston member, attains a degree sufficient for overcoming the opposing force of the preset spring 7. The reduced pressure of fluid supplied to balancing chamber 21, as effected by the venturi action in passageway 16, is desirable in that it eliminates the tendency of piston member 4 to move prematurely to its cutoff position, as would be the case if fluid under pressure were permitted to flow unrestrictedly through passageway 16 to balancing chamber. A tendency of premature movement of piston member 4 toward its cutoff position would possibly produce partial closing of valve 29 and, therefore, a consequent delay in buildup of delivery pressure to the desired cutoff level. Though the connection of passageway 22 to passageway 16 is shown and described as being located at the throat or narrowest part of the venturi and is preferably so located for obtaining maximum effect of the venturi action, said connection could be located, if preferred, at some other part of the venturi so long as the pressure of fluid flowing to balancing chamber 21 is reduced to some lesser degree than that of fluid pressure delivered to outlet 18.

When the force of spring 7 is overcome, in the manner above described, piston member 4 is caused to move downwardly, as viewed in the drawing, out of its normal position toward a cutoff position, and while moving downwardly to its cutoff position, said piston member carries stem 6 with it and, therefore, causes valve support member 25 and valve element 29 to be operated to their closed and seated positions, respectively, above defined.

If the pressure of fluid in delivery chamber 15, and therefore in balancing chamber 21 acting on pressure area 23, drops below the preselected degree of pressure, as determined by the setting of spring 7, said spring becomes effective for moving piston member 4 and stem 6 upwardly to cause unseating of valve element 29, whereupon fluid pressure in supply chamber 14 may flow to delivery chamber 15, outlet 18 and to balancing chamber 21 for restoring the degree of delivered pressure at the outlet 18 to said preselected degree, in the manner above described.

As was above noted, balancing chamber 21 is connected to cutoff valve chamber 28 via the pipe 30. A balanced state of fluid pressure is thus maintained on both sides of the valve assemblage 24 thereby neutralizing any fluid pressure differentials therebetween and any effects therefrom as would affect the degree of pressure acting on pressure area 23 in opposition to the force of spring 7. The spring 27, which is of relatively low compression rating, is provided to compensate for the frictional resistance offered by an O-ring 31 (for preventing leakage between supply chamber 14 and chamber 28 when valve 29 is in its seated position) with the surface of bore 26 during downward movement of the valve support member 25 from its supply position to its closed position.

Having now described the invention, what we claim as new and desire to secure Letters Patent is:

1. A fluid-pressure-regulating valve device comprising:
   a. a fluid pressure inlet,
   b. a fluid pressure outlet,
   c. first passage means through which fluid under pressure may flow from said inlet to said outlet,
   d. valve means interposed in said first passage means,
   e. valve-operating means operably connected to said valve means, said valve-operating means being subject to a force acting on one side thereof and movable responsively thereto in one direction for operating said valve means to an open position in which communication through said first passage means is open,
   f. venturi means disposed in said first passage means communicating fluid pressure in said first passage means to a pressure chamber adjacent the opposite side of said valve-operating means via a passageway having one end opening to said venturi means and other end opening to said chamber,
   g. said valve-operating means being movable in a direction opposite to said one direction in response to buildup of fluid pressure in said pressure chamber to a predetermined value sufficient for overriding said force to effect operation of said valve means to a closed position in which communication through said first passage means is closed,
   h. said venturi means being effective for maintaining the pressure of fluid in said pressure chamber acting on said opposite side of said valve-operating means at a lesser degree than that delivered to the outlet for sustaining said valve means in a fully opened position until such pressure at the outlet attains said predetermined value, and
   i. second passage means communicating said fluid pressure chamber with the side of said valve means opposite that adjacent the first passage means for effecting a balanced state of fluid pressure on both sides of the valve means, when in its closed position, at a level corresponding to that of delivered pressure at the outlet.